United States Patent [19]
Mitchell

[11] 3,898,549
[45] Aug. 5, 1975

[54] VARIABLE DUTY CYCLE BALANCED DC/DC POWER CONVERTER

[75] Inventor: Daniel M. Mitchell, Cedar Rapids, Iowa

[73] Assignee: Rockwell International Corporation, El Segundo, Calif.

[22] Filed: Apr. 22, 1974

[21] Appl. No.: 462,695

[52] U.S. Cl. .................. 321/2; 321/18; 323/17; 323/22 T; 307/240
[51] Int. Cl.² ........................................ H02M 3/335
[58] Field of Search ............ 321/2, 18; 323/DIG. 1, 323/17, 22 T; 307/240, 243, 246

[56] References Cited
UNITED STATES PATENTS

| | | |
|---|---|---|
| 3,490,028 | 1/1970 | Modiano ................................ 321/2 |
| 3,559,031 | 1/1971 | La Vigna ............................... 321/2 |
| 3,737,756 | 6/1973 | Hasley et al. .......................... 321/2 |
| 3,838,329 | 9/1974 | Michelet et al. ....................... 321/2 |

Primary Examiner—Gerald Goldberg
Attorney, Agent, or Firm—Howard R. Greenberg

[57] ABSTRACT

A balanced DC/DC power converter employs a transformer in combination with a simplified arrangement for generating variable duty cycle pulses to deliver a load voltage which may be greater or less than the power supply voltage.

14 Claims, 1 Drawing Figure

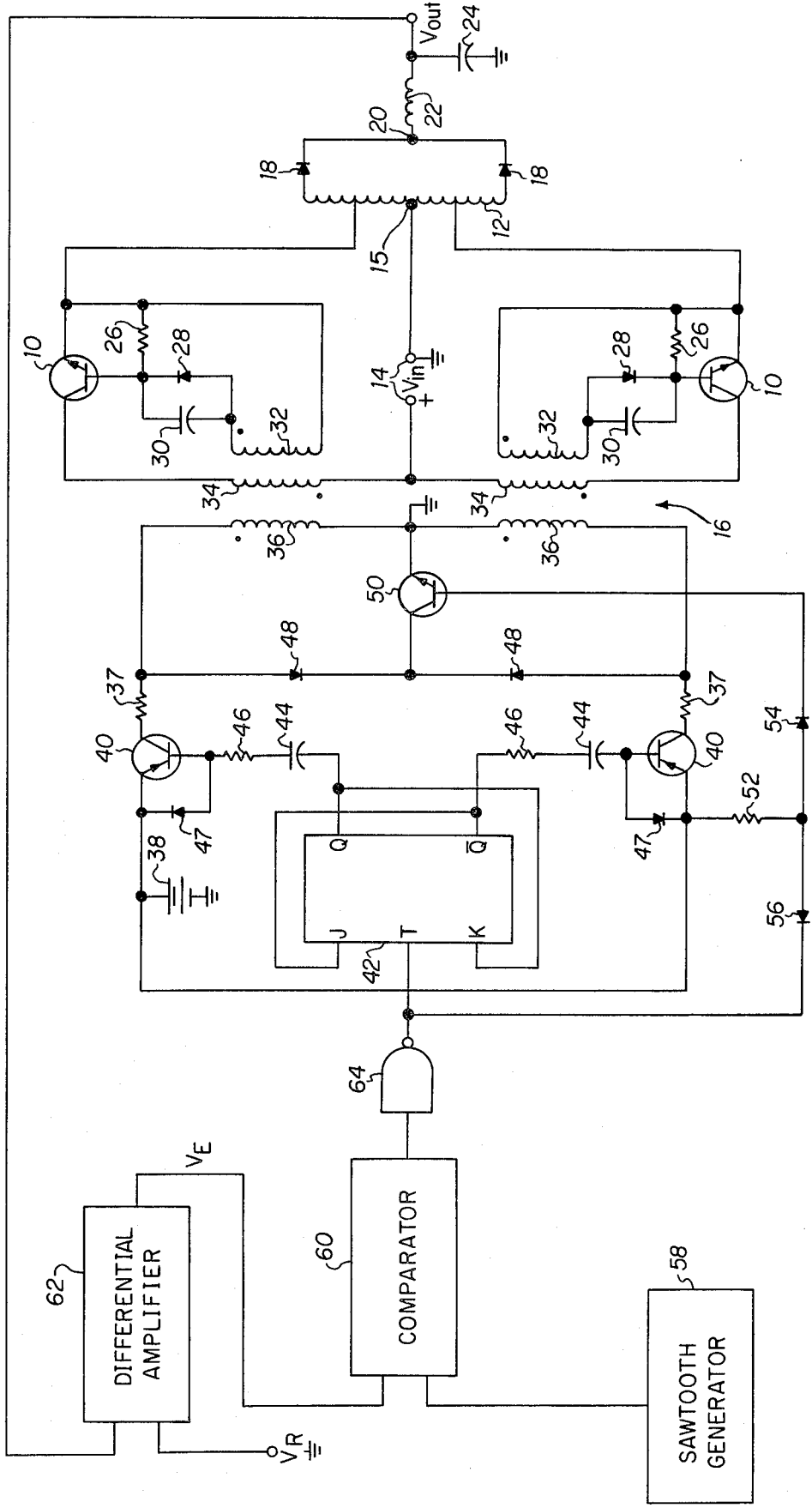

VARIABLE DUTY CYCLE BALANCED DC/DC POWER CONVERTER

BACKGROUND OF THE INVENTION

The present invention pertains generally to DC/DC power converters and specifically to a balanced converter which employs a transformer and variable duty cycle pulses for providing a regulated DC voltage which may be greater or less than the power supply voltage. The invention herein described was made in the course of or under a contract with the U.S. Department of the Air Force.

It is well known that many types of DC electric equipment require a substantially constant DC voltage which is important if not critical to optimum performance. Thus, there have been numerous schemes developed for regulating the voltage of a DC power supply before applying it to the requisite load in order to maintain a fairly constant load voltage irrespective of load and/or supply voltage variations. Many of these schemes require substantial equipment, making the scheme feasible only when space and weight and in some cases efficiency are not crucial design considerations. However, when the foregoing factors become important, such as in the design of solid state equipment which is used aboard aircraft vehicles, the designer is severely restricted by the voltage regulating schemes availabe. For example, a typical problem is the delivery of several hundred watts of DC power at a regulated DC voltage of 26 or 28 volts from a DC power supply aboard the aircraft whose voltage can vary anywhere between 22 and 33 volts.

There are many well known techniques employing small and efficient equipment for providing a regulated DC voltage whenever the equipment is operating in a buck mode so that the regulated voltage delivered to the load is always less than the DC supply voltage. The designer is confronted with a more difficult problem when the voltage regulating equipment must operate in both a boost or buck mode to provide a regulated DC voltage which may at times be greater than as well as less than the DC supply voltage. One approach is the use of a balanced DC/DC power converter wherein a DC voltage is altered by developing periodic DC pulses therefrom which are then passed through a transformer in a balanced operational mode in push-pull fashion, and wherein the output voltage to the load is controlled by the pulse duty cycle, viz. the ratio of pulse duration to the cyclical period. This approach, although highly effective, requires complex control circuitry for providing properly formed and timed DC pulses to achieve the desired regulated voltage. The reader may gain an understanding and appreciation for the problem involved by referring to a paper written by T. A. LaVigna, entitled "A Buck-Boost Main Bus Voltage Regulator For A Solar Array Battery Space Power System" which appeared in the 1970 PCSC Record (Power Conditioning Signal Conference) at pages 105-113, carrying IEEE identification No. 70C 31-AES.

With the foregoing in mind, it is a primary objective of the present invention to provide a new and improved variable duty cycle balanced DC/DC power converter for delivering a load voltage which may be greater or less than the power supply voltage.

It is a further object of the present invention to provide such a power converter wherein the duty cycle may be varied easily and simply, thus minimizing the amount of control circuitry required.

It is still a further object of the present invention to provide such a converter which is small, light, and highly efficient.

The invention may be best understood by referring to the detailed description hereinbelow together with the single appended drawing which depicts schematically the preferred embodiment.

BRIEF DESCRIPTION OF THE INVENTION

The DC/DC power converter of the invention delivers a load voltage which may be greater or less than the DC power supply voltage by varying the duty cycle of the DC pulses passing through the transformer thereof. The pulses are applied alternately, via a pair of power transistors to the transformer in a balanced circuit configuration, in push-pull fashion in order to obviate residual magnetic core problems.

The circuitry for controlling the generation of the pulses includes separate signal means for initiating, terminating and maintaining each pulse so as to provide rapid turn-off times and minimize the amount of control current, thus maximizing efficiency. Control is effectuated through a simplified arrangement requiring a single control transformer energized through a pair of transistors and a pair of diodes in combination with a transistor wherein the transistors are render conductive periodically, to apply control signals to the power transistors via the control transformer.

DETAILED DESCRIPTION OF THE INVENTION

As shown in the attached drawing, the invention employs a pair of power transistors 10, each having its emitter connected to a different end of the input winding of a transformer 12 functioning in a balanced push-pull arrangement, viz. the transistors 10 are alternately forward biased so that while one is turned on, the other is turned off. The transformer 12, as depicted herein, can be an autotransformer when it is desired to minimize the weight and size of the equipment and its output need not be electrically isolated from its input and its output voltage relative to its input voltage lies within the normal design range for autotransformers (usually 1.5). A pair of power terminals 14 are provided for connection to the DC power supply whose voltage, represented by $V_{IN}$, is to be altered to some desired regulated level before application to the requisite load. For example, in the case of aircraft DC power supplies, the regulated level might be in the order of 26 volts, while $V_{IN}$ could vary anywhere between 22 and 33 volts.

One power terminal 14, shown grounded for convenience, is connected to the center tap 15 of the input winding of transformer 12 while the other power terminal 14, shown positive for convenience, is connected to the collectors of transistors 10 through windings of a control transformer 16 which will be described in detail later on. When each transistor 10 is enabled by the application of a forward bias signal to its base, current from the DC power supply passes through its collector-emitter path and the half-section of the input winding of transformer 12 connected between its emitter and the grounded power terminal 14. The period of enablement is short enough so that the transformer 12 cannot be driven into magnetic saturation, thus always permitting magnetic coupling between its input and output windings. Since transformer 12 is periodically energized from a DC power source, the power current through each enabled transistor 10 increases linearly during each enablement period, with this period determining in part the pulse duty cycle, viz. the ratio of time that current flows through each transistor 10 (constituting a DC pulse) to the cyclical period as determined by the frequency of operation. The balanced operation employed herein for alternately enabling transistors 10 and consequently their associated halves of the input windings of transformer 12 prevents the build-up of residual magnetism in the transformer which might otherwise create operating problems.

The DC pulses which are alternately applied to the input winding halves of transformer 12 are passed to its output winding by transformer action, as well as partial electrical conduction action for the auto-transformer shown in the preferred embodiment, and then applied to the load via a pair of diodes 18, each being connected between a common point 20 and the ends of the transformer 12 output winding. It will be readily seen that the diodes 18 are poled so that each time a transistor 10 is enabled, a DC voltage pulse appears across the common point 20 and the center tap 15, which in the case of the auto-transformer embodiment herein is common to both its input and output windings. Although these DC pulses could be applied directly to the load, which may in fact be done for some types of loads which are not that sensitive thereto, a filter circuit comprising inductor 22 and capacitor 24 can be included for providing at its output across the capacitor terminals a smooth, continuous DC voltage for application to more sensitive type loads. This DC voltage, designated $V_{OUT}$, is in fact the regulated voltage which the invention is designed to provide irrespective of variations in the load and DC power supply voltage $V_{IN}$ and is determined solely by the pulse duty cycle once the other parameters (e.g. transformer turns ratio, $V_{IN}$, electrical component values) have been specified. With fixed parameters, the higher the duty cycle, the higher is $V_{OUT}$, there being a linear relationship between the two, as will be seen shortly. For optimum performance, the turns ratio of transformer 12 should be selected to yield the desired regulated voltage with a duty cycle of 50% (maximum permissible for balanced operation) at full load and the minimum anticipated DC power supply voltage.

Each power transistor 10 is controlled through a biasing arrangement comprising a resistor 26, diode 28, and capacitor 30 from a winding 32 of control transformer 16 connected between its base and emitter. Each of two other windings 34 of transformer 16, formed by tapping a single winding at its center, are connected in series with the collector-emitter path of a different one of the transistor 10. Two more windings 36 of transformer 16, also formed by tapping a single winding at its center, are provided for magnetically coupling signals to windings 32. Using the conventional transformer "dot" system of notation, whereby current into the dotted end of a transformer winding causes current to flow out of the dotted end of another of the transformer windings, it will be readily seen that the poling arrangement depicted in the attached drawing is such that when any one of the windings 34 or 36 is energized by passage of a current therethrough, a forward bias signal is developed in one of the windings 32 while a reverse bias signal is developed in the other winding 32 thereby enabling one transistor 10 and inhibiting the other transistor 10. The windings 32, 34 and 36 shown on top constitute one set of windings for enabling the upper power transistor 10, while the lower windings 32, 34 and 36 constitute a second set of windings for enabling the lower power transistor 10.

A transistor 10 is enabled by applying an energizing pulse to the winding 36 of its associated set, the pulse lasting only long enough to initiate conduction in the transistor. Conduction during the enablement period is maintained thereafter by developing a forward bias signal in winding 32 of the enabled transistor 10 from the passage of collector-emitter current at this time through winding 34 of the associated set. This latching arrangement for forward biasing the transistor 10 during the enablement period permits the forward bias current driving the transistor to be proportional to the load current, thereby resulting in greater efficiency of operation and permitting faster transistor turn-off times than possible with fixed current biasing which drives a transistor into deep saturation under light load conditions.

An enabled transistor 10 is disabled by placing a short circuit across either one or both of windings 36, thereby inhibiting the maintenance of a forward bias potential in winding 32. Although not absolutely necessary, it is preferable to maintain the short circuit across windings 36 until the beginning of the next enablement period, thus assuring that the power transistor(s) 10 are not inadvertently turned on by some transient signal which would cause power to flow at the improper time.

The energizing pulses are alternately applied, through current limiting resistors 37, to windings 36, each having its center tapped end grounded, from a grounded DC power source 38 via the collector-emitter path of a pair of control transistors 40 which are alternately enabled via a J-K flip-flop 42 and individual timing circuits comprising a capacitor 44 and a resistor 46 serially connected between the base of the associated transistor 40 and an output of the flip-flop 42. Each time flip-flop 42 changes state, its low output forward biases the transistor 40 whose base is connected thereto thus rendering it conductive until the capacitor 44 connected therebetween charges to a value great enough to deprive the enabled transistor of sufficient forward bias to maintain conduction thereby inhibiting it. The capacitor 44 is thereafter recharged, through diode 47, when the flip-flop 42 next changes state thereby producing a high at the output to which the capacitor 44 is connected. The flip-flop 42 changes state each time a negative going pulse is applied to its toggle (T) input.

A short circuit is applied across the windings 36 via diodes 48 by enabling a transistor 50 whose collector-emitter path is connected to the grounded end of the windings 36 and the commonly connected cathodes of diodes 48. Transistor 50 is enabled by applying a forward bias to its base from power source 38 through a resistor 52 and a diode 54. When it is desired to remove the short circuit, transistor 50 is inhibited by depriving its base of sufficient forward bias current by applying a low signal, such as ground, to the anode of diode 54 through a diode 56. It will be noted that because flip-flop 42 is toggled by the same signal which disables transistor 50, the short circuit appearing across windings 36 is always removed simultaneously with the initiation of an energizing pulse.

The signal for toggling flip-flop 42 and controlling transistor 50 is developed from a sawtooth generator 58 which operates at a fixed frequency (which determines the cyclical period of the converter operation) and whose output is connected to one of the inputs of a comparator 60 having a second input connected to the output of a differential amplifier 62. The amplifier 62 provides an error voltage $V_E$ against which the output of the sawtooth generator 58 is compared so that the output of comparator 60 is high at the beginning of each sawtooth cycle until the sawtooth voltage exceeds $V_E$ after which the comparator output changes to a low level for the remainder of the cycle. The output of comparator 60 is passed through an inverter 64 to apply to the T input of flip-flop 42 and diodes 56 a negative pulse at the beginning of each sawtooth cycle which removes the short circuit across windings 36 and causes an energizing pulse to be generated, thereby enabling one of the power transistors 10. If desired, inverter 64 can have other inputs for maintaining the short circuit, thus inhibiting power transfer through the DC/DC power converter at undesirable times based on any performance parameters. For example, overload current protection can be easily provided by monitoring the collector-emitter current through power transistors 10 to provide a low signal via a second input to inverter 64 to momentarily inhibit converter operation when some transient current exceeds a predetermined dangerous level. The enabled power transistor 10 remains conductive even after the termination of the energizing pulse by virtue of the load current passing through the winding 34 associated therewith until the sawtooth voltage exceeds $V_E$ at which time transistor 50 is enabled to apply a short circuit to the windings 36 via the high singal appearing at the output of inverter 64. Thus, it is seen that the period of enablement for a power transistor 10 which determines the pulse duty cycle is equivalent to the amount of time necessary for the sawtooth voltage to exceed $V_E$. The greater $V_E$, the longer the time required for the sawtooth voltage to exceed it and therefore the longer is the period of enablement and the duty cycle (for a fixed operating frequency).

Although $V_E$ could be fixed in order to generate pulses having a fixed duty cycle, $V_E$ is permitted to vary in accordance with the output voltage $V_{OUT}$ in order to keep $V_{OUT}$ at the desired regulated level which is predetermined by the reference voltage $V_R$ against which $V_{OUT}$ is compared in the differential amplifier 62. In the particular embodiment described herein, if $V_E$ is zero or negative, then the output of comparator 60 would always be high, thus preventing power from being delivered to the load. Consequently, at steady state operation, $V_{OUT}$ will always be slightly less than $V_R$ so as to produce a positive $V_E$ for insuring the generation of DC pulses through the power transistors 10. As $V_{OUT}$ decreases from the reference voltage $V_R$, $V_E$ increases so as to increase the duty cycle to compensate therefor; since the duty cycle is determined by the amount of time required for a sawtooth voltage, which is a linearly increasing signal, to attain a value ($V_E$) which is linearly proportional to the decrease in $V_{OUT}$ it will be readily seen that $V_{OUT}$ is linearly proportional to the duty cycle when $V_{OUT}$ is less than $V_R$. When $V_{OUT}$ is greater than $V_R$ the duty cycle is 0%.

It is, of course, realized that other approaches are possible for permitting $V_{OUT}$ to operate at or above $V_R$ through various modifications and further that $V_E$ could be made dependent on any other desired parameter such as the voltage of the DC power supply $V_{IN}$, load current, etc. As mentioned earlier, the turns ratio of the transformer 12 should be selected so that with the minimum anticipated power supply voltage $V_{IN}$ at full load, the desired regulated voltage is obtained with a 50% duty cycle. As the output voltage then goes up as the result of either reduced load or increasing power supply voltage $V_{IN}$ or both, the duty cycle is reduced so as to bring $V_{OUT}$ back to the desired regulated level. This assures optimum operation.

The invention described herein is thus seen to provide a simplified arrangement for controlling the pulse duty cycle of a balanced DC/DC power converter thereby permitting smaller, lighter, and more efficient equipment to be used in conjunction with the transformer for delivering a load voltage which may be greater or less than the DC power supply voltage. Since modifications to the foregoing detailed description which do not depart from the scope and spirit of the invention may be readily apparent to those skilled in the art, the preferred embodiment presented herein is to be construed as exemplary and not restrictive of the invention as claimed hereinbelow.

What is claimed is:

1. A variable duty cycle balanced DC/DC power converter comprising:
   transformer means having an input winding with a center tap for connection to one terminal of a DC power supply;
   a pair of switching circuit means, each being connected between a different end of the input winding of said transformer means and the other power supply terminal for passing current therebetween when enabled; and
   control circuit means for alternately enabling said switching circuit means periodically to pass DC pulses therethrough wherein the period of enablement which determines the pulse duty cycle is initiated by one control signal, maintained thereafter by a second control signal derived from the current flow through the enabled switching circuit means, and terminated by a third control signal.

2. The converter of claim 1 wherein the output winding of said transformer means has a center tap and including a pair of rectifying circuit means, each being connected between a common point and a different end of said output winding for providing a DC voltage pulse across said common point and said output winding center tap during each enablement period.

3. The converter of claim 2 including filter circuit means whose input is connected between said common point and said output winding center tap for providing at its output a continuous DC voltage which is a linear function of the duty cycle.

4. The converter of claim 3 wherein the output voltage of said filter circuit means is applied to said control circuit means to control the duty cycle so that it decreases as the output voltage increases.

5. The converter of claim 1 wherein the duty cycle is 50% for the minimum anticipated power supply voltage at full load.

6. The converter of claim 1 wherein said transformer means is an autotransformer.

7. The converter of claim 1 wherein each switching circuit means includes a transistor whose collector-emitter path is connected between the power supply terminal and said input winding and whose base is connected to said control circuit means for receiving the control signals.

8. The converter of claim 7 wherein said control circuit means includes a control transformer having a set of three windings for each of said transistors, a first winding connected between the base and emitter of its associated transistor for applying thereto the control signals, a second winding for magnetically coupling to said first winding the first and third control signals and a third winding connected in series with the collector-emitter path of the associated transistor for magnetically coupling to said first winding the second control signal, poled so that current flow through either the second or third winding of a set induces a forward bias signal in the first winding of the set and a reverse bias signal in the first winding of the other set.

9. The converter of claim 8 wherein the first control signal is generated by momentarily energizing the second winding associated with the transistor to be enabled thereby.

10. The converter of claim 8 wherein the third control signal is generated by shorting out at least one of said second windings.

11. The converter of claim 10 wherein the third control signal is removed simultaneously with the initiation of the first control signal.

12. A control circuit for controlling the duty cycle of pulses through a pair of switching devices in a balanced DC/DC power converter operating at a predetermined frequency comprising:

a transformer having a set of three windings for each of the switching devices wherein a first winding is connected to the device for enabling it when either the second or third winding of the associated set is energized and disabling it when either the second or third winding of the other set is energized;

circuit means for connecting each of said second windings in series with the pulse path of its associated device;

pulse circuit means for periodically generating and alternately applying energizing pulses to said third windings, the pulse duration being long enough to initiate conduction through the switching devices; and disabling means for applying a short circuit to at least one of said third windings following the termination of each energizing pulse.

13. The control circuit of claim 12 wherein said disabling means is responsive to the output voltage of the power converter so that the time between the termination of an energizing pulse and the application of the short circuit decreases as the output voltage increases.

14. The control circuit of claim 12 wherein the short circuit is removed simultaneously with the initiation of each energizing pulse.

* * * * *